United States Patent
Chun (10) Patent No.: US 9,333,859 B2
(45) Date of Patent: May 10, 2016

(54) METHOD FOR AUTOMATICALLY CONTROLLING VEHICLE INFOTAINMENT SYSTEM AND VEHICLE INCLUDING VEHICLE INFOTAINMENT SYSTEM

(71) Applicant: Hyundai Motor Company, Seoul (KR)

(72) Inventor: Chang Woo Chun, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/556,103

(22) Filed: Nov. 29, 2014

(65) Prior Publication Data

US 2016/0075233 A1    Mar. 17, 2016

(30) Foreign Application Priority Data

Sep. 17, 2014  (KR) .................. 10-2014-0123817

(51) Int. Cl.
*B60R 11/00*    (2006.01)
*B60R 25/00*    (2013.01)
*B60K 35/00*    (2006.01)
*G06F 15/16*    (2006.01)

(52) U.S. Cl.
CPC ..................................... *B60K 35/00* (2013.01)

(58) Field of Classification Search
CPC ........ B60R 11/00; B60R 25/00; G11B 20/10; G10L 15/22; G06F 15/16; G06F 7/00
USPC ........... 701/36, 2, 49, 53; 709/217, 219, 246; 707/104.1
See application file for complete search history.

(56) References Cited

U.S. PATENT DOCUMENTS

| 8,874,301 | B1* | 10/2014 | Rao ...................... | B60K 28/066 180/272 |
| 2013/0030645 | A1* | 1/2013 | Divine .................... | B60R 25/00 701/36 |
| 2014/0277973 | A1* | 9/2014 | Nedorezov .............. | B60R 25/00 701/53 |

FOREIGN PATENT DOCUMENTS

KR    10-2011-0092899 A    8/2011
KR    10-2014-0100152 A    8/2014

* cited by examiner

*Primary Examiner* — Tan Q Nguyen
(74) *Attorney, Agent, or Firm* — Mintz Levin Cohn Ferris Glovsky and Popeo, P.C.; Peter F. Corless (57) ABSTRACT

A method for automatically controlling a vehicle infotainment system includes: detecting, by one or more sensors of a vehicle, whether a user of the vehicle is located in the vehicle when a door event of the vehicle occurs; and controlling, by a controller of the vehicle, an infotainment system of the vehicle so as to pause multimedia data that is playing in the infotainment system, when the one or more sensors detect that the user is not located in the vehicle.

9 Claims, 5 Drawing Sheets

METHOD FOR AUTOMATICALLY CONTROLLING VEHICLE INFOTAINMENT SYSTEM AND VEHICLE INCLUDING VEHICLE INFOTAINMENT SYSTEM

CROSS-REFERENCE TO RELATED APPLICATION

This application claims priority to and the benefit of Korean Patent Application No. 10-2014-0123817 filed in the Korean Intellectual Property Office on Sep. 17, 2014, the entire contents of which are incorporated herein by reference.

BACKGROUND (a) Technical Field

The present disclosure relates to a method for automatically controlling a vehicle infotainment system and a vehicle including the vehicle infotainment system, and more particularly, to a method for automatically controlling a vehicle infotainment system using vehicle boarding information of a user, e.g., a driver or a passenger, and a vehicle including the infotainment system.

(b) Description of the Related Art

An infotainment system is used to provide information to a user. The information provided to the user may be stored in the infotainment system (e.g., a motion picture on digital versatile disc (DVD)), may be received from another source (e.g., broadcasted radio or a television program) by the infotainment system, or may be created by the infotainment system (e.g., a portable navigation device) based on any input data such as time of data, a current location, or the like. The above-mentioned information may be typically provided to user in an audio form, a visual form, or a combination thereof.

Notably though, there is a need to provide personalized contents which are suitable for specific demands to a driver or a passenger of a vehicle, such as an infotainment system that is implemented in a vehicle. The above-mentioned personalized content may be particularly useful for a driver and passenger who are driving long distances, as an example.

A vehicle infotainment system that implements an intelligent transport system (ITS) may include a vehicle navigation system, which provides surrounding road conditions, or the like, to the driver of the vehicle based on a current location of the vehicle by introducing location information using a global positioning system (GPS) satellite to the vehicle. For example, the vehicle navigation system may detect location information of the vehicle using GPS information received from the GPS satellite and provide map information corresponding to the location information using the detected location information of the vehicle.

The vehicle may also be installed with a vehicle multimedia device, such as an audio device, an audio and video (AV) device, a digital multimedia broadcasting (DMB) terminal, and the like, in addition to the navigation system as mentioned above, for convenience of the user. Images which are associated with various operations of the vehicle multimedia device may be displayed by a display device, and the display device may be generally installed in a center fascia (e.g., center console) between a driver seat and a passenger seat in the vehicle.

The above information disclosed in this Background section is only for enhancement of understanding of the background of the disclosure, and therefore, it may contain information that does not form the related art that is already known in this country to a person of ordinary skill in the art.

SUMMARY

The present disclosure has been made in an effort to provide a method for automatically controlling a vehicle infotainment system, as well as a vehicle including the infotainment system, having advantages capable of automatically controlling the infotainment system according to vehicle boarding information of a user, such as a driver or a passenger.

Embodiments of the present disclosure provide a method for automatically controlling a vehicle infotainment system including: detecting, by one or more sensors of a vehicle, whether a user of the vehicle is located in the vehicle when a door event of the vehicle occurs; and controlling, by a controller of the vehicle, an infotainment system of the vehicle so as to pause multimedia data that is playing in the infotainment system, when the one or more sensors detect that the user is not located in the vehicle.

The door event may include an opening event of a vehicle door and a closing event of the vehicle door.

The one or more sensors may include one or more of: a weight sensor, a proximity sensor, and a camera which is installed in a seat of the vehicle.

The method may further include caching, by the controller, streaming data or broadcasting data from a time at which the door event occurs in a streaming buffer of the infotainment system when the multimedia data includes the streaming data or the broadcasting data.

The method may further include detecting, by the one or more sensors, for a second time, whether the user is located in the vehicle when the door event occurs for a second time; and controlling, by the controller, the infotainment system so as to play the multimedia data that is paused in the infotainment system, when the one or more sensors detect that the user is located in the vehicle.

The method may further include controlling, by the controller, the infotainment system so as to play the streaming data or the broadcasting data which is cached in the streaming buffer, when the multimedia data that is playing in the infotainment system, after being paused in the infotainment system, includes the streaming data or the broadcasting data.

The method may further include interrupting, by the controller, communication between the infotainment system and a mobile communication network, when the multimedia data that is paused in the infotainment system includes streaming data which is transmitted via the mobile communication network.

The method may further include controlling, by the controller, the infotainment system so as to play the multimedia data that is paused in the infotainment system, in response to a "turn on" signal that occurs when the vehicle turns on.

Furthermore, according to embodiments of the present disclosure, a vehicle including an infotainment system includes: one or more sensors detecting whether a user is located in the vehicle; the infotainment system playing or pausing multimedia data; and a controller controlling the infotainment system so as to pause the multimedia data that is playing in the infotainment system, when the one or more sensors detect that the user is not located in the vehicle, and controlling the infotainment system so as to play the multimedia data that is paused in the infotainment system, when the one or more sensors detect that the user is located in the vehicle.

The infotainment system may include an audio video navigation (AVN) device playing or pausing the multimedia data;

and a telematics unit (TMU) receiving the multimedia data and providing the received multimedia data to the AVN device.

The infotainment system may further include a streaming buffer caching streaming data or broadcasting data from a time at which a door event of the vehicle occurs, when the multimedia data includes the streaming data or the broadcasting data, and providing the cached data to the AVN device, when the one or more sensors detect that the user is located in the vehicle.

Furthermore, according to embodiments of the present disclosure, a non-transitory computer readable medium containing program instructions for automatically controlling a vehicle infotainment system in a vehicle including one or more sensors that detect whether a user of the vehicle is located in the vehicle, includes: program instructions that control the infotainment system so as to pause multimedia data that is playing in the infotainment system, when the one or more sensors detect that the user is not located in the vehicle; and program instructions that control the infotainment system so as to play the multimedia data that is paused in the infotainment system, when the one or more sensors detect that the user is located in the vehicle.

According to embodiments of the present disclosure, the method and computer readable medium for automatically controlling the vehicle infotainment system, as well as the vehicle including the infotainment system, may maintain an organic user experience (UX) and reduce data communication fees by controlling the vehicle infotainment functionality, according to whether or not the user (e.g., a client) is on board in the vehicle. Further, since a client-customized service depending on a vehicle boarding situation of the user/client may be provided, the user experience (UX) consuming music content, video content, broadcasting contents, and the like, may be organically connected (i.e., maintained) while not being disconnected, and portions which are missed by the user in broadcasting service data may be reduced, thereby improving satisfaction of the user. Even further, excessive data consumption due to unnecessary streaming may be prevented, and thus, data communication fees of the user or an infotainment service provider may be reduced.

BRIEF DESCRIPTION OF THE DRAWINGS

A brief description of the drawings is provided below to more sufficiently understand the drawings which are used in the detailed description of the present disclosure.

DETAILED DESCRIPTION OF THE EMBODIMENTS

In order to sufficiently understand the present disclosure and the object achieved by embodying the present disclosure, the accompanying drawings illustrating embodiments of the present disclosure and contents described in the accompanying drawings are to be referenced. In describing the present disclosure, well-known configurations or functions will not be described in detail since they may unnecessarily obscure the gist of the present disclosure. The same reference numeral present in the respective drawings may indicate the same component.

Terms used in the present specification are merely used to describe embodiments and are not intended to limit the present disclosure. Singular forms used herein are intended to include plural forms unless explicitly indicated otherwise. It will be understood that the term "comprises" or "have" used in this specification, specifies the presence of stated features, numerals, steps, operations, components, parts, or a combination thereof, but does not preclude the presence or addition of one or more other features, numerals, steps, operations, components, parts, or a combination thereof.

Unless indicated otherwise, it is to be understood that all the terms used in the specification including technical and scientific terms have the same meaning as those that are understood by those who skilled in the art. It must be understood that the terms defined by the dictionary are identical with the meanings within the context of the related art, and they should not be ideally or excessively formally defined unless the context clearly dictates otherwise.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is configured to execute the program instructions to perform one or more processes which are described further below.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
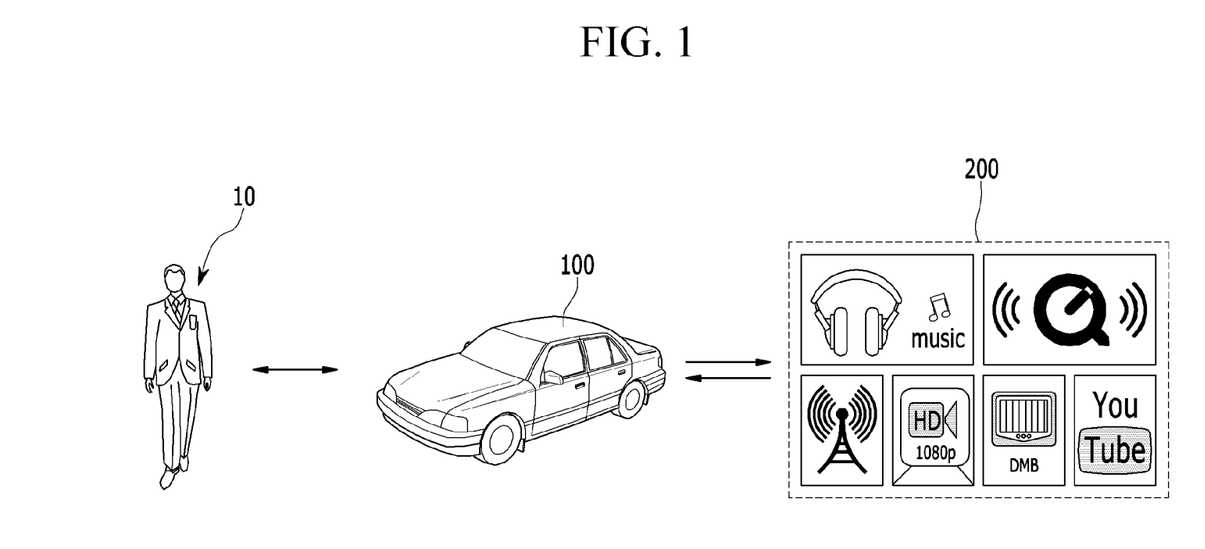
FIG. 1 is a drawing describing a vehicle using a method for automatically controlling a vehicle infotainment system according to embodiments of the present disclosure.

FIG. 1 is a drawing describing a vehicle using a method for automatically controlling a vehicle infotainment system according to embodiments of the present disclosure.

Referring to FIG. 1, when a client who is a user 10 of a vehicle, such as a driver or passenger, boards the vehicle 100 (or opens or closes a door of the vehicle 100), the vehicle 100 may detect boarding information of the user (or open or close information of the door of the vehicle). For example, the vehicle 100 may identify whether or not the user 10 boards the vehicle (e.g., whether the user is located in the vehicle) using a weight sensor, a proximity sensor, or a camera which is installed in a seat of the vehicle 100.

The vehicle 100 may play, pause, or cache (e.g., maintain or store) multimedia information (i.e., multimedia data) 200, in response to the detected boarding information. The multimedia 200 may be played by the infotainment system installed in the vehicle 100.

The vehicle infotainment system (i.e., vehicle infotainment device), which is an incorporated system of core functionality information, such as drive, guide, and the like, and entertainment information and human friendly functions, may be a system in which navigation, audio and video, and Internet are coupled in the vehicle. More specifically, the vehicle infotainment system, may include devices or technologies providing searching of Internet, vehicle, movies, games, TVs, social network service (SNS), and the like, various services linked to navigation and a mobile device, and the like in the vehicle.

When the user 10 leaves the seat of the vehicle 100 for a moment, the vehicle 100 (i.e., the infotainment system of the vehicle) may pause the play of multimedia, such as music, a movie, etc. Thereafter, when the user 100 re-enters the vehicle 100, the infotainment system of the vehicle 100 may again play the multimedia so as to associate (i.e., connect) user experience (UX). More specifically, under the conditions in which the user is not located in the vehicle 100, the infotainment system of the vehicle 100 may pause multimedia that is playing, and when the user 10 again boards the vehicle 100, it may again play the multimedia which has been paused.

In the case in which the user 100 leaves the seat of the vehicle 100 (i.e., is not located in the vehicle), when the multimedia data 200 includes radio broadcasting data (i.e., radio streaming data) or digital multimedia broadcasting (DMB) data, the infotainment system of the vehicle 100 may store a portion of the radio or DMB broadcasting data for a moment and play the broadcasting data from a missing portion (i.e., the stored portion) when the user 100 re-enters the vehicle 100, thereby making it possible to provide convenience of an infotainment service user. In the case of broadcasting service, the broadcasting data of the missing portion (i.e., data while the user 10 is not present in the vehicle 100) may be stored (i.e., cached) in a memory having designated capacity (i.e., or a streaming buffer) under the conditions in which the play of the multimedia is paused, and the stored data may be reset once a designated (e.g., predetermined) time lapses. In the case of infotainment streaming service using a mobile communication network, under the conditions in which the play of the multimedia is paused, data communication (e.g., wireless data communication) may be immediately stopped after the play of the multimedia is paused, or the data communication may be stopped after the streaming data of the missing portion (i.e., data while the user 10 is not located in the vehicle 100) is cached in the memory having designated capacity. Therefore, in the case in which the user 10 uses a streaming service of the infotainment system of the vehicle 100 using the mobile communication network, data consuming amount may be reduced.

As described above, according to the present disclosure, the operation of the infotainment system may be automatically controlled depending on whether or not the user (e.g., the driver, passenger, etc.) is located in the vehicle (e.g., boards the vehicle).

Figure 2:
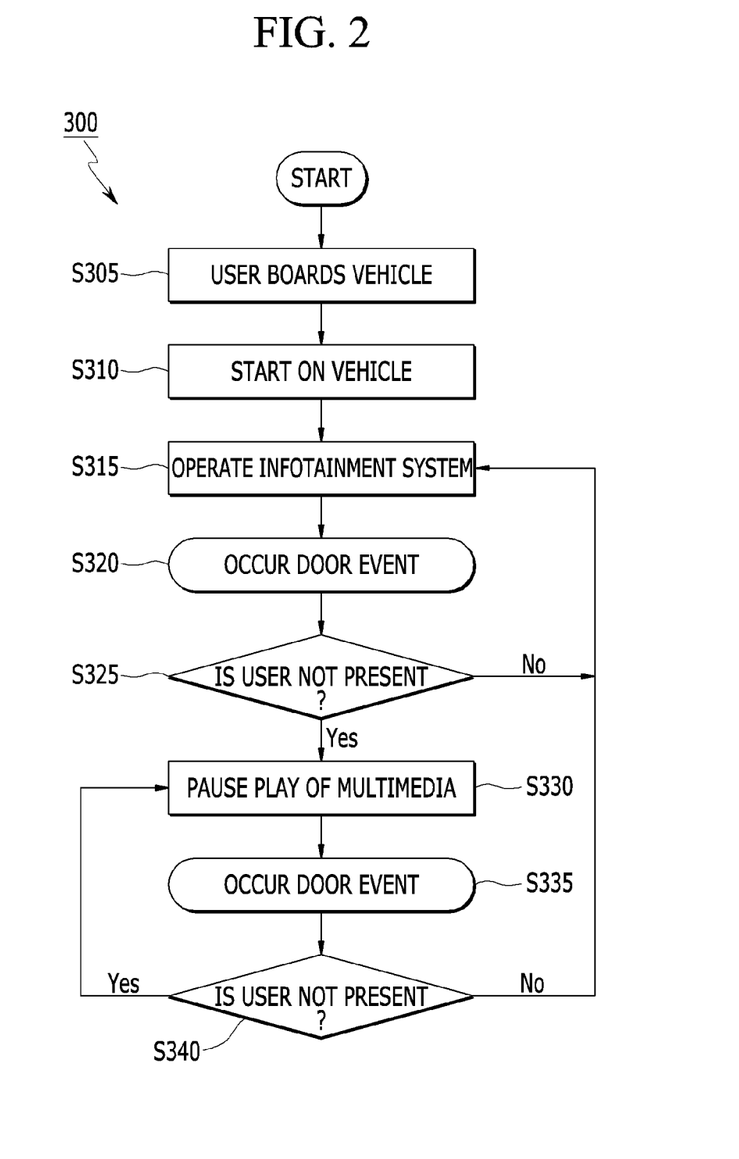
FIG. 2 is a flow chart generally illustrating a method for automatically controlling a vehicle infotainment system according to embodiments of the present disclosure.

FIG. 2 is a flow chart generally illustrating a method for automatically controlling a vehicle infotainment system according to embodiments of the present disclosure. A method 300 for automatically controlling a vehicle infotainment system may be applied to the vehicle 100 shown in FIG. 1. Referring to FIGS. 1 and 2, in boarding step (S305), the user 10 may board the vehicle 100.

In the starting on step (S310), the user 10 may start on (i.e., turn on) the vehicle.

In the operating step (S315), when the vehicle 100 turns on, the infotainment system included in the vehicle 100 may be operated. When the infotainment system is operated, multimedia may be played. The infotainment system may be operated by the user of the vehicle 100.

In the first door event occurring step (320), after the infotainment system is operated, a door event, which may include, for example, an opening operation of a vehicle door or a closing operation of a vehicle door may occur, e.g., by the user of the vehicle 100. Alternatively, the door event may include only the opening operation of the vehicle door or only the closing operation of the vehicle door.

In the first user presence checking step (S325), after the first door event occurs, the vehicle 100 may check whether or not the user is present (i.e., located) in the vehicle 100 using one or more sensors, for example. That is, the one or more sensors included in the vehicle 100 may detect (e.g., search) user presence information about whether or not the user of the vehicle 100 is present in the vehicle 100 when the door event of the vehicle occurs.

If it is checked that the user of the vehicle 100 is present in the vehicle in the first user presence checking step (S325), the method 300 for automatically controlling the vehicle infotainment system, which is a process, proceeds to the operating step 315. If it is checked that the user of the vehicle 100 is not present in the vehicle in the first user presence checking step (S325), the method 300 for automatically controlling the vehicle infotainment system proceeds to multimedia play pausing step S330.

In the multimedia play pausing step S330, the multimedia that is playing in the infotainment system may be paused.

In the second door event occurring step (S335), after the multimedia that is playing in the infotainment system is paused, the door event, such as the opening operation of the vehicle door and the closing operation of the vehicle door, may again occur (i.e., for a second time). The door event may include only the opening operation of the vehicle door.

In the second user presence checking step (S40), after the second door event occurs, the vehicle 100 may again check whether or not the user is present in the vehicle 100 using the sensor. That is, the one or more sensors included in the vehicle 100 may detect (e.g., search) user presence information about whether or not the user of the vehicle 100 is present in the vehicle 100 when the door event of the vehicle occurs.

If it is determined that the user is located in the vehicle 100 in the second user presence checking step (S340), the method 300 for automatically controlling the vehicle infotainment system may proceed to the operating step 315. If it is determined that the user is not located in the vehicle 100 in the second user presence checking step (S340), the method 300 for automatically controlling the vehicle infotainment system may proceed to the multimedia play pausing step 330.

Figure 3:
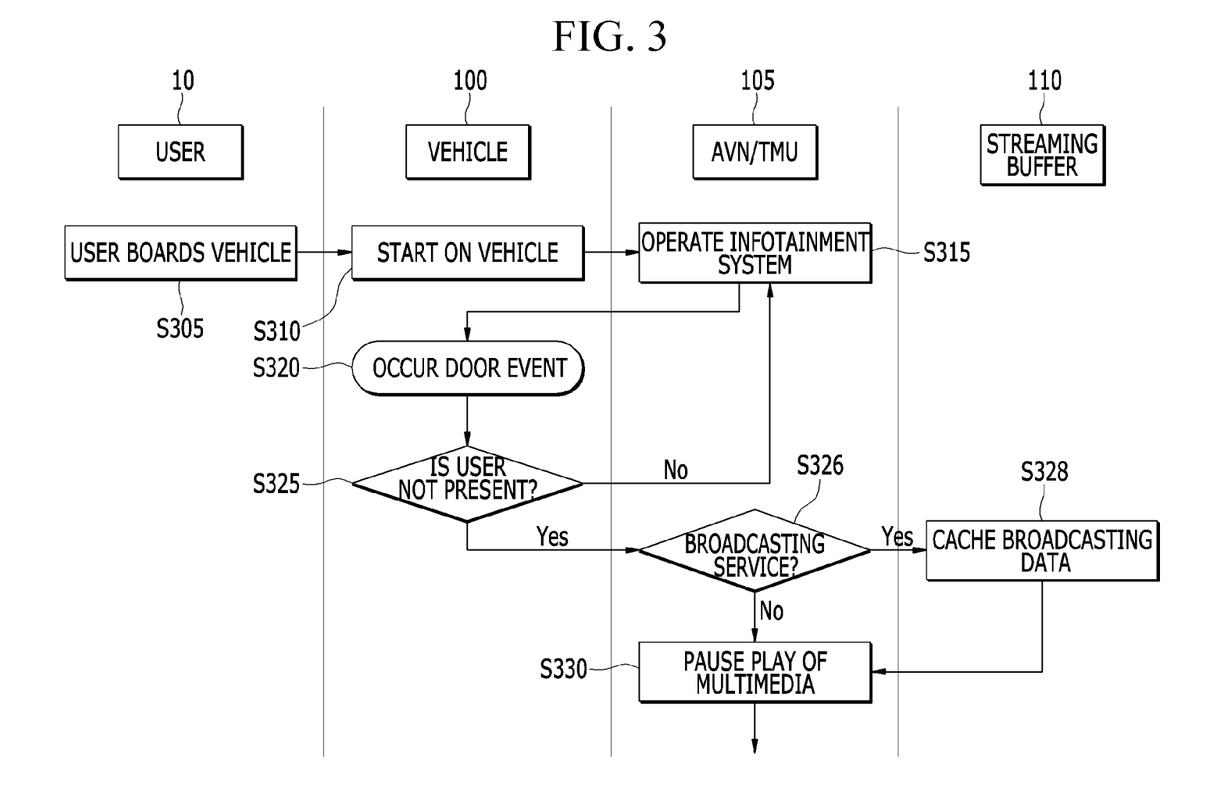
FIG. 3 is a drawing describing embodiments of the method for automatically controlling the vehicle infotainment system illustrated in FIG. 2.

FIG. 3 is a drawing describing embodiments of the method for automatically controlling the vehicle infotainment system illustrated in FIG. 2. The embodiments may include the detailed control logic 300 of the method for automatically controlling the vehicle infotainment system shown in FIG. 2.

Referring to FIG. 3, the user 10 may board the vehicle 100 (S305). The user 10 may be the driver or the passenger of the vehicle 100. The user of the vehicle 100 may start (i.e., turn on) the vehicle (S310).

When the vehicle 100 is turned on, the infotainment system included in the vehicle 100 may be operated (S315). When the infotainment system including an AVN/TMU device (105) is operated, multimedia may be played. The AVN/TMU 105 may include an audio video navigation (AVN) device and a telematics unit. Alternatively, the infotainment system may be turned on and operated by the user regardless of the start on of the vehicle.

After the infotainment system is operated, the door event such as the opening operation of the vehicle door and the closing operation of the vehicle door may occur by the user of the vehicle 100 (S320). The door event may include only the opening operation of the vehicle door, for example. The streaming service data or the broadcasting service data may be cached from a streaming buffer 110 included in the infotainment system from the moment at which the door event occurs.

After the door event occurs, the one or more sensors of the vehicle 100 may check (i.e., detect) whether the user is present (i.e., located) in the vehicle 100 (S325). After the door event occurs, whether or not the user is present may be detected for a predetermined time (setting time). For example, by disposing the one or more sensors in at least one seat of the vehicle, the condition capable of detecting whether or not all passengers or the driver board may be established.

If the user is present in the vehicle 100, the multimedia may be continuously operated by the AVN/TMU device 105 which is continuously operated (S315). If the user is not present in the vehicle 100, the AVN/TMU 105 may check whether or not the multimedia information (i.e., multimedia data) is the broadcasting service information (i.e., broadcasting service data) (S326).

If the played multimedia data does not include the broadcasting service data (i.e., broadcasting data), the AVN/TMU device 105 may pause the multimedia that is playing (S330). In the case of the data streaming service such as the data streaming service data via the mobile communication network, the AVN/TMU device 105 may cache some data (e.g., data for a predetermined time) and then stop data communication.

If the played data is the broadcasting service data, the streaming buffer 110 included in the infotainment system may continuously cache the broadcasting data (S328). In this case, the streaming buffer 110 may cache the broadcasting data only up to a preset threshold time (or timeout). If more than the threshold time lapses, the broadcasting data may be no longer cached. Optionally, caching data exceeding the threshold time may be deleted.

Figure 4:
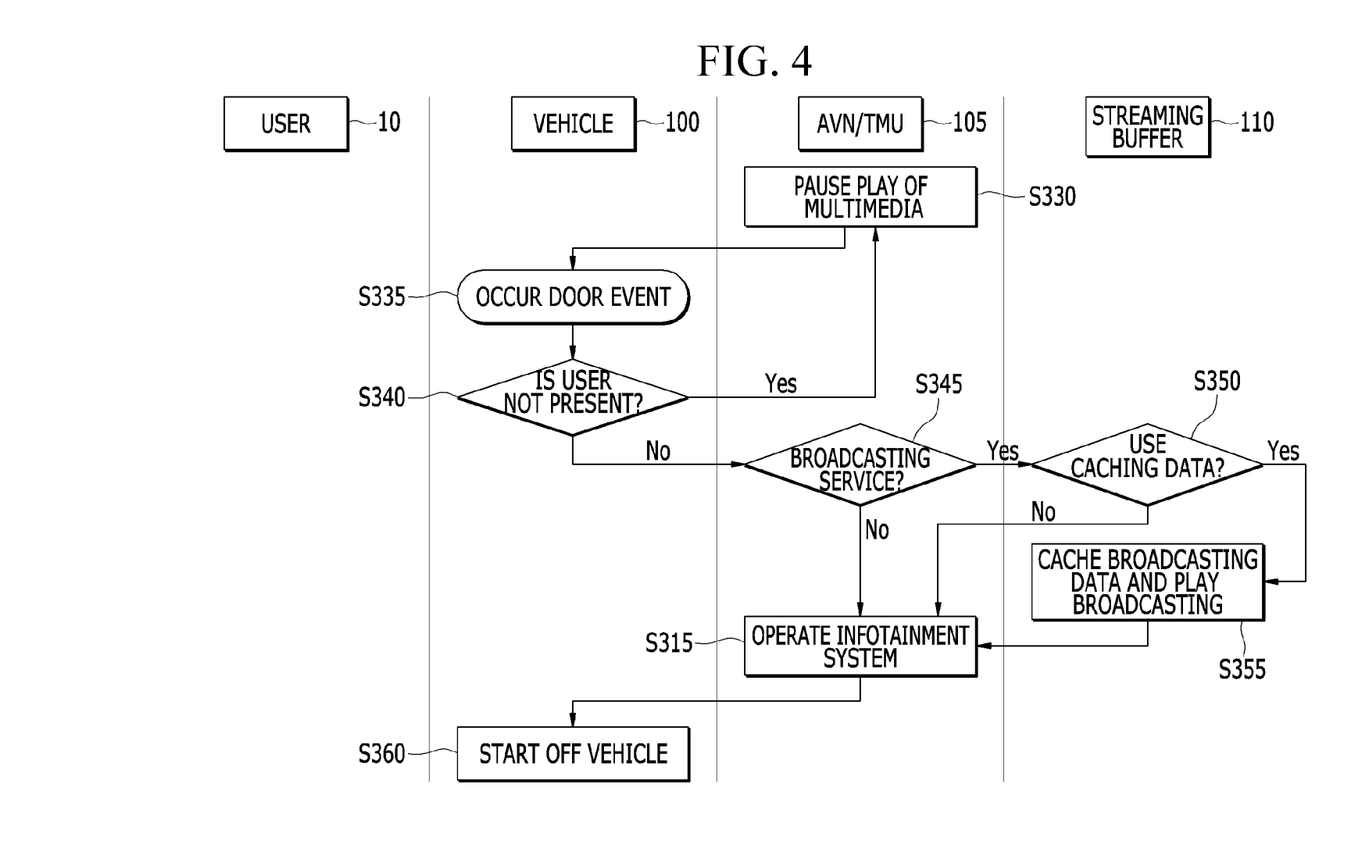
FIG. 4 is a drawing describing embodiments of the method for automatically controlling the vehicle infotainment system illustrated in FIG. 2.

FIG. 4 is a drawing describing embodiments of the method for automatically controlling the vehicle infotainment system illustrated in FIG. 2. The embodiments may include a detailed control logic 300 for performing the method for automatically controlling the vehicle infotainment system shown in FIG. 2 which is performed after the method for automatically controlling the vehicle infotainment system shown in FIG. 3.

Referring to FIG. 4, after the play of the multimedia by the AVN/TMU device 105 is paused, the door event may again occur in the vehicle 100 by the user (S335). After the door event occurs, the sensor of the vehicle 100 may again check (i.e., detect) whether or not the user is present (i.e., located) in the vehicle 100 (S340). After the door event occurs, whether or not the user is present may be detected for a predetermined time. For example, by disposing sensor(s) in each of seats of the vehicle, the condition capable of detecting whether or not all passengers or the driver board may be established.

If the user is not located in the vehicle 100, the AVN/TMU device 105 may continue to pause the multimedia (S330). If the user is present in the vehicle 100, the AVN/TMU device 105 may check whether or not the broadcasting service data (i.e., broadcasting data) is present in the paused multimedia data (S345).

If the paused multimedia data does not include the broadcasting data, the infotainment system including the AVN/TMU device 105 may be operated to again play the multimedia (S315). In the case of the data streaming service among the played multimedia services, the AVN/TMU device 105 may immediately play the cached data and may initiate (i.e., start) the data communication. If the paused multimedia data does include the broadcasting data, the AVN/TMU device 105 of the infotainment system may check whether or not playable caching data is present in the streaming buffer 110 (S350).

If there is no available caching data, the infotainment system may be operated to play the broadcasting data which is currently transmitted. If there is caching data, the streaming buffer 110 may cache the broadcasting data which is currently transmitted, and the AVN/TMU device 105 may be operated to stream the broadcasting data which is pre-cached in the streaming buffer 110 (S355 and S315). After the infotainment system is operated, if the user turns off the vehicle 100, the method 300 for automatically controlling the vehicle infotainment system may be finished (S360).

Examples of a scenario which is performed by the method 300 for automatically controlling the vehicle infotainment system will be described with reference to FIGS. 1 to 4 as follows.

The user 10, who is the client, may board the vehicle 100 such as a diesel vehicle, start on the vehicle 100, and may then listen to music by executing an AHA radio application in the AVN device such as an AVN4.5 terminal. The AVN4.5 terminal may provide (i.e., support) a technology (i.e., function) such as Bluetooth, WiFi, GPS navigation, radio broadcasting (e.g., satellite radio or high definition radio), hands free, and the like.

The user 10 may stop the vehicle during driving of the vehicle 100 while listening to music, and may get out of the vehicle 100 while keeping an engine of the vehicle running and visit a convenience store, for example. When the user 10 gets out of the vehicle 100, the method 300 for automatically controlling the vehicle infotainment system described above may be operated. When the opening event of the vehicle door occurs, the one or more sensors included in the vehicle 100 may detect whether or not the user 10 is present in the vehicle 100.

The streaming service data or the broadcasting service data may be allocated (i.e., designated) to the streaming buffer 110 at the same time as the event occurrence to initiate the caching. Whether or not the user 10 is present in the seat may be periodically searched by the sensor installed in the seat within a predetermined time (e.g., 1 minute or more to 2 minutes or less).

If the user 10 gets out of the vehicle 100 (i.e., the sensor(s) detects that the user 10 is not present in the seat), in the case of the broadcasting, the broadcasting caching logic may be performed and the play of the infotainment service data may be paused. Therefore, since the AHA radio service is the data streaming service, the data communication is stopped and a data consuming amount may be reduced.

referring to the above example, after the user 10 gets out of the vehicle 100, the user 10 finishes his/hers business in the convenience store within 5 minutes and may again board the vehicle 100. When the user 10 again boards the vehicle 100, the method 300 for automatically controlling the vehicle infotainment system may be operated. The closing event of the vehicle door or the opening event of the vehicle door may occur by the user 10.

When the closing event of the vehicle door or the opening event of the vehicle door occur, whether or not the user is present in the seat may be periodically searched by the sensor every a predetermined time (e.g., 1 to 2 minutes). If the user 10 boards the vehicle 100, and the sensor detects that the user 10 is present in the seat, the broadcasting service may cache the currently broadcasted information and play the pre-cached data, and the infotainment service may be resumed by the operation of the infotainment system. Since the AHA radio service is the data streaming service, the cached data may be immediately played and a streaming communication connection may be again resumed.

As a result, according to the present disclosure, the music from the portion that the user may not hear well while opening the vehicle door and getting out of the vehicle, may be played again.

Figure 5:
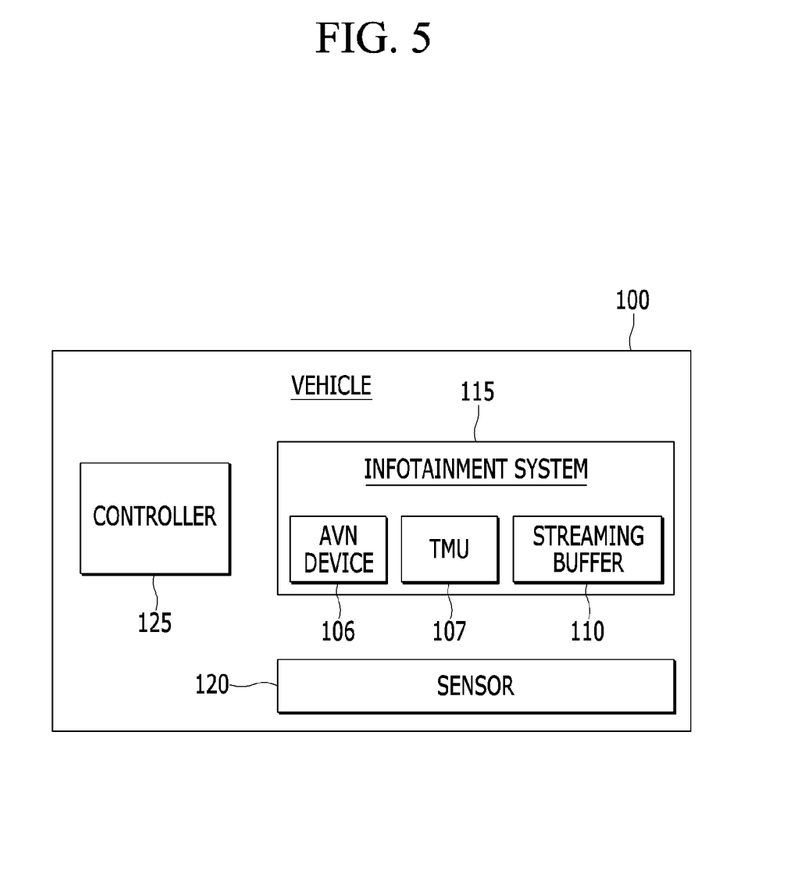
FIG. 5 is a block diagram describing embodiments of the vehicle illustrated in FIG. 1.

FIG. 5 is a block diagram describing an exemplary embodiment of the vehicle illustrated in FIG. 1. Referring to FIG. 5, the vehicle may include an infotainment system 115, a sensor 120, and a controller (e.g., infotainment controller) 125. The infotainment system 115, the sensor 120, and the controller 125 may use a battery in the vehicle 100 as a power supply. The infotainment system 115 may include an audio video navigation (AVN) device (or AVN terminal) 106, a telematics unit (TMU) 107, and a streaming buffer 110.

The controller 125 may perform a function of a central processing unit (CPU) and may control the entire operation of the infotainment system 115 and the sensor 120. The sensor 120, which may include multiple sensors, may detect whether or not the user (10 in FIG. 1) boards the vehicle 100. The sensor(s) 120 may include a weight sensor, a proximity sensor, and/or a camera which is installed in the seat of the vehicle 100, for example.

The infotainment system 115 may play the multimedia data. The infotainment system 115 may be operated by an operation in which the user of the vehicle 100 presses a button linked to the controller 125. Also, the controller 125 may control the infotainment system 115 so as to play the multimedia in response to a turn on signal occurring when the vehicle turns on. The controller 125 may control the infotainment system 115 so as to pause the multimedia data that is playing when the sensor(s) 120 detect that the user is not located in the vehicle 100, and may control the infotainment system 115 so as to again play the multimedia data that is paused when the sensor 120 detects that the user boards the vehicle 100.

The infotainment system 115 may include an AVN device 106 playing the multimedia data, and a telematics unit (TMU) 107 receiving the multimedia data from the outside (i.e., from an external device) and providing (i.e., transmitting) it to the AVN device (106). The multimedia data may be, for example, streaming data. Also, the multimedia data may be data which is not provided from the external device and is stored in the AVN device 106).

The AVN device 106 may be a system incorporating a multimedia device and a navigation device. For example, the telematics unit (TMU) 107 may receive the multimedia data from a telematics multimedia system (TMS) center providing the infotainment service to the vehicle 100, via a wireless communication network. The TMS center, which is a TMS service center, may be implemented by a server.

The infotainment system 115 may further include a streaming buffer 110 which caches the streaming data or the broadcasting data from a time at which the door event of the vehicle 100 occurs when the play-paused multimedia data is the streaming data or the broadcasting data, and provides the cached data to the AVN device 106 when the sensor 120 detects that the user boards the vehicle 100 after the door event of the vehicle 100 again occurs.

Accordingly, the one or more sensors 120 included in the vehicle 100 may detect whether or not the user is present (i.e., located) in the vehicle when the door event of the vehicle occurs, and the controller 125 included in the vehicle 100 may control the infotainment system 115 included in the vehicle 100 so as to pause multimedia that is playing when the sensor 120 detects that the user is not located in the vehicle. The door event may include, for example, the opening event of the vehicle door and the closing event of the vehicle door. Moreover, when the multimedia data (e.g., media data) which is played in the infotainment system 115 includes the streaming data or the broadcasting data, the controller 125 may control the streaming data or the broadcasting data from a time at which the door event occurs so as to be cached (i.e., stored) in the streaming buffer of the infotainment system.

When the multimedia data that is playing based on streaming data which is transmitted via the mobile communication network, and the multimedia data is paused, the controller 125 may control the infotainment system 115 so as not to receive the streaming data any more by interrupting communication between the infotainment system 115 and the mobile communication network. Then, the one or more sensors may again detect whether or not the user of the vehicle is located in the vehicle when the door event of the vehicle 100 again occurs, and the controller 125 may control the the infotainment system 115 so as to play the multimedia data that is paused, when the sensor 120 detects that the user is located in the vehicle 100. When the multimedia data (i.e., media data) which is again played in the infotainment system 115 includes the streaming data or the broadcasting data, the controller 125 may control the infotainment system 115 so as to play the streaming data or the broadcasting data which is cached (i.e., stored) in the streaming buffer 110.

The components, units, blocks, modules, or the like, which are used in the present disclosure may be implemented in software such as a task, a class, a subroutine, a process, an object, an execution thread, or a program which is performed in a predetermined region on the memory, or hardware such as a field programmable gate array (FPGA) or an application-specific integrated circuit (ASIC), and may be performed in a combination of the software and the hardware. The components, parts, or the like, may also be embedded in a computer-readable storage medium, and some thereof may be dispersedly distributed in a plurality of computers.

As set forth above, the drawings and the specification have been disclosed. Herein, specific terms have been used, but are just used for the purpose of describing the present disclosure and are not used for qualifying the meaning or limiting the scope of the present disclosure, which is disclosed in the appended claims. Therefore, it will be understood by those skilled in the art that various modifications and equivalent embodiments are possible from the present disclosure. Accordingly, the actual technical protection scope of the present disclosure should be determined by the spirit of the appended claims.

DESCRIPTION OF SYMBOLS

100: vehicle
105: AVN/TMU
106: AVN device
107: TMU
110: streaming buffer
115: infotainment system
120: sensor
125: controller
200: multimedia data

What is claimed is:

1. A method for automatically controlling a vehicle infotainment system, the method comprising:
   detecting, by one or more sensors of a vehicle, whether a user of the vehicle is located in the vehicle when a door event of the vehicle occurs;
   controlling, by a controller of the vehicle, an infotainment system of the vehicle so as to pause multimedia data that is playing in the infotainment system, when the one or more sensors detect that the user is not located in the vehicle, and
   caching, by the controller, streaming data or broadcasting data from a time at which the door event occurs in a streaming buffer of the infotainment system when the multimedia data includes the streaming data or the broadcasting data.

2. The method of claim 1, wherein the door event includes an opening event of a vehicle door and a closing event of the vehicle door.

3. The method of claim 1, wherein the one or more sensors include one or more of:
   a weight sensor, a proximity sensor, and a camera which is installed in a seat of the vehicle.

4. The method of claim 1, further comprising:
   detecting, by the one or more sensors, for a second time, whether the user is located in the vehicle when the door event occurs for a second time; and
   controlling, by the controller, the infotainment system so as to play the multimedia data that is paused in the infotainment system, when the one or more sensors detect that the user is located in the vehicle.

5. The method of claim 4, further comprising:
   controlling, by the controller, the infotainment system so as to play the streaming data or the broadcasting data which is cached in the streaming buffer, when the multimedia data that is playing in the infotainment system, after being paused in the infotainment system, includes the streaming data or the broadcasting data.

6. A method for automatically controlling a vehicle infotainment system, the method comprising:
   detecting, by one or more sensors of a vehicle, whether a user of the vehicle is located in the vehicle when a door event of the vehicle occurs;
   controlling, by a controller of the vehicle, an infotainment system of the vehicle so as to pause multimedia data that is playing in the infotainment system, when the one or more sensors detect that the user is not located in the vehicle; and
   interrupting, by the controller, communication between the infotainment system and a mobile communication network, when the multimedia data that is paused in the infotainment system includes streaming data which is transmitted via the mobile communication network.

7. The method of claim 1, further comprising:
   controlling, by the controller, the infotainment system so as to play the multimedia data that is paused in the infotainment system, in response to a "turn on" signal that occurs when the vehicle turns on.

8. A vehicle including an infotainment system, the vehicle comprising:
   one or more sensors detecting whether a user is located in the vehicle;
   the infotainment system playing or pausing multimedia data; and
   a controller controlling the infotainment system so as to pause the multimedia data that is playing in the infotainment system, when the one or more sensors detect that the user is not located in the vehicle, and controlling the infotainment system so as to play the multimedia data that is paused in the infotainment system, when the one or more sensors detect that the user is located in the vehicle,
   wherein the infotainment system includes:
      an audio video navigation (AVN) device playing or pausing the multimedia data,
      a telematics unit (TMU) receiving the multimedia data and providing the received multimedia data to the AVN device, and
      a streaming buffer caching streaming data or broadcasting data from a time at which a door event of the vehicle occurs, when the multimedia data includes the streaming data or the broadcasting data, and providing the cached data to the AVN device, when the one or more sensors detect that the user is located in the vehicle.

9. A non-transitory computer readable medium containing program instructions for automatically controlling a vehicle infotainment system in a vehicle including one or more sensors that detect whether a user of the vehicle is located in the vehicle, the computer readable medium comprising:
   program instructions that control the infotainment system so as to pause multimedia data that is playing in the infotainment system, when the one or more sensors detect that the user is not located in the vehicle;
   program instructions that control the infotainment system so as to play the multimedia data that is paused in the infotainment system, when the one or more sensors detect that the user is located in the vehicle; and
   program instructions that control the infotainment system so as to cache streaming data or broadcasting data from a time at which the door event occurs in a streaming buffer of the infotainment system when the multimedia data includes the streaming data or the broadcasting data.

* * * * *